United States Patent
Asrar et al.

(10) Patent No.: US 6,841,603 B1
(45) Date of Patent: Jan. 11, 2005

(54) POLYMER BLENDS CONTAINING POLYHYDROXYALKANOATES AND COMPOSITIONS WITH GOOD RETENTION OF ELONGATION

(75) Inventors: Jawed Asrar, Chesterfield, MO (US); Jean R. Pierre, St-Denis (BE)

(73) Assignee: Metabolix, Inc., Cambridge, MA (US)

( * ) Notice: Subject to any disclaimer, the term of this patent is extended or adjusted under 35 U.S.C. 154(b) by 0 days.

(21) Appl. No.: 09/714,469

(22) Filed: Nov. 16, 2000

Related U.S. Application Data

(62) Division of application No. 09/179,780, filed on Oct. 27, 1998, now Pat. No. 6,191,203.
(60) Provisional application No. 60/063,852, filed on Oct. 31, 1997.

(51) Int. Cl.[7] .......................... C08K 3/38; C08G 63/06
(52) U.S. Cl. .................. 524/404; 524/599; 528/361
(58) Field of Search .......................... 524/404, 599; 528/361

(56) References Cited

U.S. PATENT DOCUMENTS

| | | | |
|---|---|---|---|
| 5,124,371 A | 6/1992 | Tokiwa et al. | 523/124 |
| 5,439,985 A | 8/1995 | Gross et al. | 525/411 |
| 5,506,083 A | 4/1996 | Nash et al. | 430/106 |
| 5,508,338 A | 4/1996 | Kim et al. | 524/537 |
| 5,550,173 A | 8/1996 | Hammond et al. | 523/122 |
| 5,612,401 A | 3/1997 | Brown et al. | 524/413 |
| 5,618,881 A | 4/1997 | Hojabr | 525/64 |
| 5,688,582 A * | 11/1997 | Nagaoka et al. | |
| 5,753,782 A * | 5/1998 | Hammond et al. | |
| 2002/0173558 A1 * | 11/2002 | Williams et al. | 523/124 |

FOREIGN PATENT DOCUMENTS

| | | |
|---|---|---|
| EP | 0 606 923 | 7/1994 |
| EP | 0 628 586 | 12/1994 |
| JP | 4-326932 | * 11/1992 |
| JP | 6-336523 | * 12/1994 |
| WO | 94/11445 | 5/1994 |
| WO | 94 16000 | 7/1994 |
| WO | 94 28070 | 12/1994 |
| WO | 96 09402 | 3/1996 |
| WO | 97 32929 | 9/1997 |
| WO | 97/34953 | 9/1997 |
| WO | 97 46381 | 12/1997 |

OTHER PUBLICATIONS

Chemical Abstracts, Oct. 3, 1994: 121(14), Abstract No. 158800.

* cited by examiner

*Primary Examiner*—Tae H. Yoon
(74) *Attorney, Agent, or Firm*—Pabst Patent Group LLP

(57) ABSTRACT

Biodegradable polymer blend compositions are provided which contain oligomeric esters. The oligoester compound can compatibilize blends of two or more biodegradable polymers resulting in excellent ductility and reduced tendency to embrittlement of products produced from therefrom. In a preferred embodiment of the invention, the blend composition comprises a PHA, polycaprolactone (PCL) and one or more oligomeric esters. In another preferred embodiment of the invention, the blend composition comprises a PHA, polybutylenesuccinate-adipate (PBSUA), and one or more oligomeric esters.

27 Claims, No Drawings

POLYMER BLENDS CONTAINING POLYHYDROXYALKANOATES AND COMPOSITIONS WITH GOOD RETENTION OF ELONGATION

This is a divisional of application Ser. No. 09/179,780, filed Oct. 27, 1998 now U.S. Pat. No. 6,191,203.

This application claim the benefit of U.S. Provisional Application No. 60/063,852, filed October 31, 1997.

BACKGROUND OF THE INVENTION

The present invention relates generally to biodegradable polymers. More particularly, it concerns biodegradable polymer blends containing oligomeric esters and use of such blends in the production of shaped polymeric objects having improved properties which do not diminish over time.

There has been considerable interest in recent years in the use of biodegradable polymers to address concerns over plastic waste accumulation. The potential worldwide market for biodegradable polymers is enormous (>10B lbs/yr). Some of the markets and applications most amenable to the use of such biopolymers range from single use applications, which can include packaging, personal hygiene, garbage bags, and others where the biopolymers become soiled and are ideally suited for biodegradation through composting, to markets and applications in which the biopolymers can be recovered as clean materials, such as garment bags, shopping bags, grocery bags, etc. and are suitable for recycling, as well as composting, or biodegradation in landfills.

Polyhydroxyalkanoate (PHA) biopolymers are thermoplastic polyesters, many of which can be produced by microorganisms in response to nutrient limitation. The commercial potential for PHA's spans many industries, and is derived primarily from certain advantageous properties which distinguish PHA polymers from petrochemical-derived polymers, namely excellent biodegradability and natural renewability.

Widespread use and acceptance of PHA's, however, has been hindered by certain undesirable chemical and physical properties of these polymers. For example, PHA's are among the most thermosensitive of all commercially available polymers. As such, the rate of polymer degradation, as measured by a decrease in molecular weight, increases sharply with increasing temperatures in the range typically required for conventional melt-processing of PHA's into end-products such as films, coatings, fibers etc. An additional limitation of the potential utility of PHA polymers relates to the observation that some polymer characteristics, for example ductility, elongation, impact resistance, and flexibility, diminish over time. This rapid "aging" of certain PHA-derived products is unacceptable for most commercial applications. Thus, the success of PHA as a viable alternative to both petrochemical-derived polymers and to non-PHA biodegradable polymers, will depend upon novel approaches to overcome the unique difficulties associated with PHA polymers and with products derived therefrom.

The blending of two or more polymers has become an increasingly important approach for improving the cost performance of commercial plastics. For example, blending may be used to reduce the cost of an expensive engineering thermoplastic, to improve the processability of a high-temperature or heat sensitive thermoplastic, to improve impact resistance, etc. Therefore, blending is one approach which has the potential to provide new classes of biodegradable PHA-containing polymers having unique and improved properties. In this way, it may be possible to overcome the limitations of PHA compositions that have limited their widespread industrial utilization while retaining their desirable features. Unfortunately, many polymers are immiscible when blended, and result in undesirable phase separation during processing. Generally, such blends of incompatible or thermodynamically immiscible polymers exhibit poor mechanical properties and processing difficulties.

Compatibilizing compounds have been identified and developed for numerous polymer systems. These compounds can reduce interfacial tension and thereby promote miscibility of otherwise poorly miscible polymers. The availability of compatibilizers provides an effective means by which polymeric compositions can be produced. However, with PHAs, very little has been achieved in this regard, and there is a need for the identification of compounds providing effective compatibilization of blends containing different PHA polymers or blends containing PHA and non-PHA polymers.

SUMMARY OF THE INVENTION

In accordance with one aspect of the present invention, there are provided polymer compositions comprising a first biodegradable polymer comprising a polyhydroxyalkanoate (PHA), a second biodegradable polymer different from said first polymer, and one or more oligomeric esters. It has been found that the presence of oligomeric esters as described herein provide advantageous properties to blends of two or more biodegradable polymers. As a result, blends containing the oligomeric esters exhibit ductility, impact strength and aging characteristics improved to an unexpected and unpredictable extent.

Most oligomeric esters useful in the blend compositions of this invention can be represented by following structural formula:

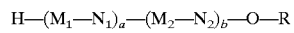

where:

$M_1$ and $M_2$=

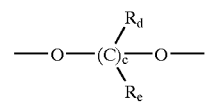

N1 and N2=—C(O)—X—C(O)—

X is $C_6H_4$ or $(CH_2)_f$ a and b are independently 0 or an integer from 1 to 200;

c and f are independently integers from 1 to 30;

R is H or $C_1$-$C_{12}$ alkyl or branched alkyl; and $R_d$ and $R^e$ are H, or $C_1$-$C_{12}$ alkyl or branched alkyl and can vary independently with each $(C)_c$.

In a preferred class of oligomeric esters, f is 2 to 10. Most preferably, the compounds are oligomeric adipic esters, i.e., f is 4.

The oligomeric ester generally will be present in the blend at a level from 1 to 20 wt. %, preferably 2 to 15 wt. % of the blend. The molecular weights of the oligomeric esters are typically in the range of 200 to 20,000, preferably 500 to 15,000, and most preferably from about 1500 to 7500.

At least one of the polymers in the blend is a PHA, preferably having the structural formula:

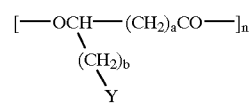

where a=1–4, b=0–15, Y is H, and n is an integer. In a most preferred composition, one of the polymers in the blend is polyhydroxybutyrate (PHB) or polyhydroxybutyrate-covalerate (PHBV).

A second polymer in the blend can be a PHA structurally distinct from the first PHA, or can be a non-PHA biodegradable polymer. The non-PHAs can be, for example, aliphatic polyesters or copolyesters derived from aliphatic: dicarboxylic acids or anhydrides, aliphatic dicarboxylic acid chlorides, aliphatic dicarboxylic acid esters, and aliphatic diols or epoxides; polyurethanes made from said polyesters and copolyesters by reaction with a diisocyanate; aliphatic polycarbonates; polyanhydrides; polyester amides; polyester carbonates; polyester ethers; or polyether carbonates. Preferred non-PHA polymers for use in the invention include aliphatic polyesters and copolyesters, and polyester urethanes. More preferred non-PHA polymers include polycaprolactone (PCL, e.g. Tone 187P PCL, Union Carbide) and polybutylenesuccinate-adipate (PBSUA, e.g. Bionolle 3001 PBSUA, Showa High Polymer Co.).

In a most preferred composition of this invention, blends are provided which comprise a PHA, polycaprolactone, and an oligomeric ester. The oligomeric ester is preferably an oligomeric adipic ester, such as poly(1,3-butylene glycol-co-1,2-propylene glycol adipic acid) terminated with 2-ethylhexanol (Santicizer*S409A; Mw=3700, available from Solutia Inc.), poly(neopentyl glycol-co-1,4-butylene glycol adipic acid) terminated with 2-ethylhexanol (Santicizer*S433; Mw=3500, available from Solutia Inc.), poly(1,3-butylene glycol adipic acid) unterminated (Santicizer*S430; Mw=2500, available from Solutia Inc.), poly(1,3-butylene glycol adipic acid) unterminated (Santicizer *S421; Mw=1250, available from Solutia Inc.), poly(1,2-propylene glycol adipic acid-co-phthalic acid) terminated with 2-ethylhexanol (Santicizer*S438; Mw=1900, available from Solutia Inc.), poly(neopentyl glycol adipic acid) terminated with 2-ethylhexanol 0.22 (Santicizer *S435; Mw=2500; available from Solutia Inc.), poly(1,2-propylene glycol adipic acid-co-phthalic acid) terminated with 2-ethylhexanol (Santicizer *431; Mw=1200; available from Solutia Inc.), poly(1,2-propylene glycol-co-1,4-butylene glycol adipic acid) terminated with 2 ethylhexanol (Santicizer *S4212; Mw=950; available from Solutia Inc.), poly (1,3-butylene glycol adipic acid) terminated with mixed fatty acids (Santicizer *S405; Mw=2000; available from Solutia Inc.), poly(1,2-propylene glycol adipic acid) terminated with 2-ethylhexanol (Santicizer* S436; Mw=3500; available from Solutia Inc.), poly(1,2-propylene glycol-co-1,4-butylene glycol adipic acid) terminated with 2-ethylhexanol (Santicizer *S449; Mw=3700; available from Solutia Inc.), poly(1,4-butylene glycol adipic acid), or poly(1,4-butylene glycol-co-ethylene glycol adipic acid).

In accordance with another aspect of this invention, there is provided a method of producing a shaped polymeric object comprising melting a composition comprising a polyhydroxyalkanoate (PHA), a second biodegradable polymer different from the first polymer, and one or more oligomeric esters, and producing a shaped object therefrom, for example by extrusion, molding, coating, spinning or calendaring operations.

In accordance with yet another aspect of the present invention, there are provided polymer compositions comprising a first biodegradable polymer comprising a poly-3-hydroxybutyrate-co-4-hydroxybutyrate (P3HB4HB) and a nucleant. It has been found that such compositions exhibit ductility, impact strength and aging characteristics improved to an unexpected and unpredictable extent.

P3HB4HB is a copolymer of 3-hydroxybutyrate (3HB) and 4-hydroxybutyrate (4HB), wherein the 3HB repeat unit has the structural formula above wherein Y=H, b=1, a=1, and n—1, and wherein the 4HB repeat unit has the structural formula above wherein Y=H, b=0, a=2, and n=1. The nucleant can be any nucleant known to be effective in nucleating PHAs. A preferred nucleant is boron nitride.

In accordance with another aspect of this invention, there is provided a method of producing a shaped polymeric object comprising melting a composition comprising poly-3-hydroxybutyrate-co-4-hydroxybutyrate (P3HB4HB) and a nucleant, and producing a shaped object therefrom, for example by extrusion, molding, coating, spinning or calendaring operations.

DESCRIPTION OF ILLUSTRATIVE EMBODIMENTS

The embodiments of the present invention relate broadly to compositions for use in the production of PHA-containing materials having wide-ranging properties that can serve to increase the versatility and performance of PHAs for various processing techniques without sacrificing biodegradability.

"Polymer blend" as used herein refers to a composition which comprises two or more structurally distinct biodegradable polymers. A first polymer in the blend is preferably a PHA. A second polymer in the blend can also be a PHA provided it is structurally distinct from the first polymer. Alternatively, the second polymer can be a biodegradable non-PHA polymer. Typically, the blends will comprise two polymer types, however additional polymers can also be present.

"Biodegradable" as the term is used herein refers to polymers which can be ultimately degraded by a microbial process under environmental exposures to $CO_2$, $H_2O$ and biomass. In certain cases, polymers such as polylactic acid are degraded by hydrolysis to individual monomer molecules which are then enzymatically decomposed to $CO_2$ and $H_2O$ by microorganisms. Examples of biodegradation processes include enzyme mediated hydrolytic and oxidative reactions that occur during composting.

"Compatibilizer" refers to a compound effective to provide a resin composition which exhibits improved compatibility compared to the same composition without the compatibilizer. Indicators of improved compatibility as described herein include, for example, increased impact strength and/or increased elongation at break.

PHAs are biodegradable polymers or copolymers having the following general structure for one or more of the repeating units:

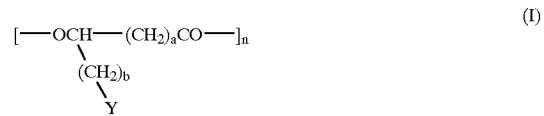

(I)

where a is 0 to 6, b is 0 to 15, Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc., and n is an integer typically between about 10 and 25,000. The pendant groups of the repeating units may contain additional functionalization such as double bonds, epoxidized double bonds, hydroxyl groups, alkyl groups, alkenyl groups etc. or combinations thereof. The polymer main chain can contain up to 8 carbons in the repeating units and there may be additional functionalization in or on the main chain such as double bonds, alkyl groups, alkenyl groups, hydroxyl groups etc. or combinations thereof.

The PHAs can be produced synthetically, or in plant or microbial organisms. Most typically, it is a fermentation product, particularly of a microbiological process, whereby a microorganism lays down polyhydroxyalkanoate during normal or manipulated growth. Manipulation may be achieved by removing or failing to produce one or more nutrients necessary for cell multiplication. Numerous microbiological species are known in the art to be suitable for the production of polyhydroxyalkanoate polymers (see for example, Anderson and Dawes, Micro. Rev. 54 (4): 4S(472, 1990). The microorganisms may be wild type or mutated or may have the necessary genetic material introduced into it, for example by any of the methods or recombinant DNA technology. It is to be emphasized that it is not necessary for the PHA-producing organism to be a microorganism, but at present such organisms are preferred.

The PHAs will typically have as constituents hydroxyalkanoates (HA) monomers which are substrates for PHA synthase enzymes. Biologically-produced PHA polymers are the product of PHA synthase microbial enzymes, and are produced in either a bacterial cell which naturally contains a PHA synthase, or in a bacterial or other cell type, for example a plant cell, which has been genetically engineered to express such an enzyme. The microbial PHA synthase enzymes have broad substrate ranges and are capable of incorporating a large number of HA monomers as constituents of biosynthetic PHA depending upon growth conditions, precursor substrate availability, and the source of the PHA synthase enzyme. The diversity in composition of biosynthetic PHA polymers is underscored by the fact that at least 91 HA monomers have been identified as substrates for PHA synthases (Steinbuchel, A. and Valentin, H. FEMS Micro. Letters 128 (1995) 219–228).

Suitable HA monomers can include those having the following formula:

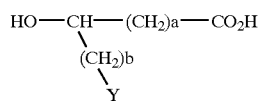

where a is 0 to 6, b is 0 to 15 and Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc. As in the above description, there may be additional functionalization in or on the pendant and/or main chains. The monomers or the lactones of the monomers can be homopolymerized or copolymerized either biochemically or synthetically to produce the polymer.

Preferred HA monomers include those where a 14, b=0–15, and Y is H. More preferably, the monomers are those where a=1–2 and b=0–3, and Y is H.

In a most preferred polymer, the PHA is of formula (1) where a is 1, b is 1 or 2 and Y is H and especially where there are units with b=1 and b=2 copolymerized together. Suitable polyesters contain a preponderance of b=1, especially with at least 70 mol % of such units, the balance being units in which b=2. Polymer containing a=1, b=1, Y=H as the only units is polyhydroxybutyrate (PHB) polyester while that containing additionally b=2 is polyhydroxy-butyrate-co-valerate (PHBV).

Other PHAs for use in the invention can be synthetically formed by approaches well known in the art, such as by lactone, lactide or glycolide ring-opening polymerization. Suitable lactones, lactides and glycolides include those that form biodegradable polylactones, polylactides and polyglycolides, respectively. Preferably, the polymer produced by ring-opening polymerization is polycaprolactone, formed from the ring opening polymerization of ε-caprolactone (6-hexanolactone).

The polymer blend compositions of the invention can comprise two or more structurally distinct PHAs as defined above, or can comprise non-PHA polymers in addition to PHAs. Non-PHA polymers suitable for the use in the blends of the present invention can include those which are to some extent biodegradable. In this way, when blended with a PHA, the resulting blend is capable of biodegradation. Furthermore, the selection of non-PHA polymer will depend upon the property or combination of properties sought to be optimized.

Generally, non-PHA polymers in the blends will include polyesters and copolyesters derived from various combinations of aliphatic dicarboxylic acids, aliphatic dicarboxylic acid chlorides, aliphatic dicarboxylic acid esters, and aliphatic diols or epoxides; polyurethanes made from such polyesters and copolyesters by reaction with a diisocyanate; aliphatic polycarbonates; polyanhydrides; polyester amides; polyester carbonates; polyester ethers; polyether carbonates; etc. Preferred non-PHA polymers for use in the invention include aliphatic polyesters and copolyesters, and polyester urethanes. More preferred non-PHA polymers include polycaprolactone (PCL, e.g. Tone 187P PCL, Union Carbide) and polybutylenesuccinate-adipate (PBSUA, e.g. Bionolle 3001 PBSUA, Showa High Polymer Co.).

For most applications and polymer combinations, the molecular weights of the polymers present in a blend will be in the range of 1000 to 2,000,000. The polymers can be blended in any manner and at any levels desired or suited for a particular application, and may vary depending upon the particular polymers selected. The relative ratio of polymers in a blend comprising two polymers can be, for example, from 99:1 to 1:99. For some applications, ratios of 90:10 to 10:90, or 80:20 to 20:80 may provide the most desired results.

The blends of the present invention contain one or more oligomeric/polymeric ester compounds (sometimes referred to herein as oligoesters), which can most typically be represented by the following formula:

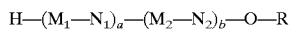

where:

$M_1$ and $M_2$=

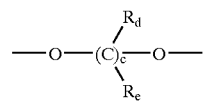

$N_1$ and $N_2$=—C(O)—X—C(O)—

X is $C_6H_4$ or $(CH_2)_f$ a and b are independently 0 or an integer from 1 to 200;

c and f are independently integers from 1 to 30;

R is H or $C_1$—$C_{12}$ alkyl or branched alkyl; and $R_d$ and $R_e$ are H, or $C_1$—$C_{12}$ alkyl or branched alkyl and can vary independently with each $(C)_c$.

The oligoesters are added to a blend in an amount effective to provide a resin composition which exhibits improved compatibility, as indicated by increased elongational and/or impact strengths, compared to the same composition without the oligoester. Typically, the oligomeric ester compounds of the invention will be present in a polymer blend at levels from 1 to 20, preferably from 2 to 15 wt. % of blend. The Mw of the oligomeric esters is generally in the range of 500 to 20,000, preferably 1000 to 10,000, most preferably 1500 to 7500.

Preferably, the compound is an oligomeric ester where f is 2 to 10. These include for example succinic (f=2); glutaric (f=3); adipic (f=4); azelaic (f=7), and sebacic (f=8) ester compounds.

Most preferably, f is 4, i.e., the oligomeric ester is an oligomeric adipic ester, such as in poly(1,3-butylene glycol-co-1,2-propylene glycol adipic acid) terminated with 2-ethylhexanol (Santicizer*S409A; Mw=3700, available from Solutia Inc.), poly(neopentyl glycol-co-1,4-butylene glycol adipic acid) terminated with 2-ethylhexanol (Santicizer*S433; Mw=3500, available from Solutia Inc.), poly(1,3-butylene glycol adipic acid) unterminated (Santicizer*S430; Mw=2500, available from Solutia Inc.), poly(1,3-butylene glycol adipic acid) unterminated (Santicizer*S421; Mw=1250, available from Solutia Inc.), poly(1,2-propylene glycol adipic acid-co-phthalic acid) terminated with 2-ethylhexanol (Santicizer*S438; Mw=1900, available from Solutia Inc.), poly(neopentyl glycol adipic acid) terminated with 2-ethylhexanol (Santicizer *S435; Mw=2500; available from Solutia Inc.), poly(1,2-propylene glycol adipic acid-co-phthalic acid) terminated with 2-ethylhexanol (Santicizer *431; Mw=1900; available from Solutia Inc.), poly(1,2-propylene glycol-co-1,4-butylene glycol adipic acid) terminated with 2 ethylhexanol (Santicizer *S4212; Mw=950; available from Solutia Inc.), poly (1,3-butylene glycol adipic acid) terminated with mixed fatty acids (Santicizer *S405; Mw=2000; available from Solutia Inc.), poly(1,2-propylene glycol adipic acid) terminated with 2-ethylhexanol (Santicizer* S436; Mw=3500; available from Solutia Inc.), poly(1,2-propylene glycol-co-1,4-butylene glycol adipic acid) terminated with 2-ethylhexanol (Santicizer *S449; Mw=3700; available from Solutia Inc.), poly(1,4-butylene glycol adipic acid), or poly(1,4-butylene glycol-co-ethylene glycol adipic acid).

In a preferred embodiment of the invention, the blend composition comprises a PHA, polycaprolactone (PCL) and one or more oligomeric esters. The PCL in the blend is preferably present at a level of 10 to 40, more preferably 20 to 30 wt % in the blend, since age-related embrittlement is minimized at such levels. However, the skilled individual would recognize that other additives, particularly plasticizers, could vary the relative levels of PHA and PCL required in the blend to achieve the desired results.

In another preferred embodiment of the invention, the blend composition comprises a PHA, polybutylenesuccinate-adipate (PBSUA), and one or more oligomeric esters. The PBSUA in the blend is preferably present at a level of 10 to 40, more preferably 20 to 30 wt % in the blend, since age-related embrittlement is minimized at such levels. However, the skilled individual would recognize that other additives, particularly plasticizers, could vary the relative levels of PHA and PBSUA required in the blend to achieve the desired results.

Preferred oligomeric esters according to these embodiments are oligomeric adipic esters such as poly(1,3-butylene glycol-co-1,2-propylene glycol adipic acid) terminated with 2-ethylhexanol (Santicizer*S409A; Mw=3700, available from Solutia Inc.), poly(neopentyl glycol-co-1,4-butylene glycol adipic acid) terminated with 2-ethylhexanol (Santicizer*S433; Mw=3500, available from Solutia Inc.), poly(1,3-butylene glycol adipic acid) unterminated (Santicizer*S430; Mw=2500, available from Solutia Inc.), poly(1,3-butylene glycol adipic acid) unterminated (Santicizer*S421; Mw=1250, available from Solutia Inc.), poly(1,2-propylene glycol adipic acid-co-phthalic acid) terminated with 2-ethylhexanol (Santicizer*S438; Mw=1900, available from Solutia Inc.), poly(neopentyl glycol adipic acid) terminated with 2-ethylhexanol (Santicizer *S435; Mw=2500; available from Solutia Inc.), poly(1,2-propylene glycol adipic acid-co-phthalic acid) terminated with 2-ethylhexanol (Santicizer *431; Mw=1200; available from Solutia Inc.), poly(1,2-propylene glycol-co-1,4-butylene glycol adipic acid) terminated with 2 ethylhexanol (Santicizer *S4212; Mw=950; available from Solutia Inc.), poly (1,3-butylene glycol adipic acid) terminated with mixed fatty acids (Santicizer *S405; Mw=2000; available from Solutia Inc.), poly(1,2-propylene glycol adipic acid) terminated with 2-ethylhexanol (Santicizer* S436; Mw=3500; available from Solutia Inc.), poly(1,2-propylene glycol-co-1,4-butylene glycol adipic acid) terminated with 2-ethylhexanol (Santicizer *S449; Mw=3700; available from Solutia Inc.), poly(1,4-butylene glycol adipic acid), or poly(1,4-butylene glycol-co-ethylene glycol adipic acid).

In addition to the blended polymers and the oligomeric esters described herein, other components can be present in the compositions of the invention, including the many polymer additives well known in the art. These can include, for example, nucleating agents, anti-blocking agents, lubricants, fillers, plasticizers, and other additives desired to optimize processing and/or product properties.

Prior to the present invention, it has been difficult to produce PHA shaped objects/articles that retain sufficient mechanical properties over their intended useful life. Instead, PHA-derived products rapidly embrittle within short periods of time, as indicated by their characteristic decline in elongational and impact properties. For example, elongation of molded PHBV bars containing 10 phr Santicizer S430 oligoester/polyester adipate (Solutia Inc.) dropped from 258% 3 hour after molding to 27% one day after molding to 10% sixty days after molding (see Example 5; Table 2). The situation was slightly improved by blending the PHBV with a structurally distinct PHA polymer, for example polycaprolactone (PCL). For PHBV bars containing 50 phr PCL, elongation was 235% one day after molding dropping to 26% after sixty days (see Example 1; Table 1). A similar trend was observed when the commonly used plasticizer acetyl-tributyl-citrate (ATC) was added to the blend; elongation was 340% one day after molding, dropping to 50% after sixty days. Clearly, any improved elongational properties provided by these approaches were not sustainable and declined over time at unacceptable rates.

However, quite unexpectedly, when an oligomeric adipic ester according to the present invention is included in a blend of a PHA and another biodegradable polymer, excellent elongational properties are achieved and are maintained for at least 100 days after molding. For example, with PHBV containing 50 phr PCL and 10 phr of the oligoester Santicizer S430 (Solutia Inc.), elongation was 379% one day after molding, dropping only slightly to 348% after sixty days and remaining essentially unchanged after 100 days (see Examples 3 and 4; Table 1). These improvements in ductility and the reduced tendency to embrittlement for blends of PHAs containing oligoesters are clearly much greater than would be expected in view of the relatively modest improvements observed with a single PHA containing an oligoester or the results for blends of PHAs not containing an oligoester. Thus, the present invention provides compositions having exceptional elongational properties which can be sustained for lengths of time required in many commercial plastics applications.

Based on the results described herein, the compositions of this invention possess properties that would be desirable in numerous applications such as extrusion, molding, coating, spinning, blowing, thermoforming and calendaring processes or combinations of such processes. For example, increased melt strength of the blends compared with PHA alone is advantageous in the production of cast and blown films (both oriented and unoriented) for food packaging, grocery, lawn and trash bags, diaper backsheets and agricultural films having improved elongation to break sustainable over extended periods of time. The compositions are also suitable for use in extrusion and injection stretch blow molding operations, for example to prepare oriented bottles having improved impact strength over extended periods of time. Disposable food packaging articles such as tubs and containers, medical goods such as syringes, labware, and patient kits, as well as disposable plates, cups, knives and forks with improved tensile properties can also be made by injection molding operations using the compositions of the invention. The compositions can also be extruded into sheets and thermoformed into food packaging, plates, bowls etc. In addition, the blends can be melt spun into fibers for threads, ropes, nets as well as disposable nonwovens for medical applications. The skilled individual would recognize that the compositions of the invention are not limited by the above description, rather they are useful in essentially any application where increased melt strength, elongation, impact and/or aging characteristics are desired.

Preparation of the blend for use in melt extrusion of a shaped article can be performed using techniques known in the art. In one technique, the blend is prepared as a melt blend by melting of the first polymer, the second polymer, the oligoester, and optionally other additives, followed by pelletizing of the melt. The pellets of the blend are then used conventionally in melt extrusion techniques of forming shaped articles. Alternatively, the blend is prepared as a physical blend, by combining pellets, powders, or other formulations of the first polymer, the second polymer, the oligoester, and optionally other additives, in conventional melt extrusion techniques to produce shaped articles comprising the desired composition. The use of physical blends is preferred, in that the number of melt steps required to prepare a shaped article comprising a composition of the present invention is reduced.

As used herein, the term "molecular weight", unless otherwise specified, refers to the weight average molecular weight (Mw) as opposed to the number average molecular weight (Mn). Most synthetic polymers have a broad distribution of molecular weights, and the molecular weights reported for such polymers represent averages, most frequently defined by Mw or Mn according to the following formulas:

$$M_w = \sum_i n_i M_i^2 \Big/ \sum_i n_i M_i$$

$$M_n = \sum_i n_i M_i \Big/ \sum_i n_i$$

where $n_i$=the number of molecules of molecular weight $M_i$. The most commonly used technique for determining Mw and Mn is by gel permeation chromatography (GPC) where values of Mw and Mn are obtained by calibration using monodisperse polystyrene fractions of known molecular weights. This method is capable of determining the entire molecular weight distribution of a polymer sample from which molecular weight averages can be determined. Other methods known in the art for determining Mw and Mn include osmometry, scattering and sedimentation (See for example, W. R. Sorensen & T. W. Campbell: Preparative Methods of Polymer Chemistry, Interscience Publishers, NY, 1961).

In accordance with yet another aspect of the present invention, there are provided polymer compositions comprising or consisting of a first biodegradable polymer comprising a poly-3-hydroxybutyrate-co-4-hydroxybutyrate (P3HB4HB) and a nucleant. It has been found that such compositions exhibit ductility, impact strength and aging characteristics improved to an unexpected and unpredictable extent.

P3HB4HB is a copolymer of 3-hydroxybutyrate (3HB) and 4-hydroxybutyrate (4HB), wherein the 3HB repeat unit has the structural formula above wherein Y=H, b=1, a=1, and n=1, and wherein the 4HB repeat unit has the structural formula above wherein Y=H, b=0, a=2, and n=1. The percentage of 4HB units in the P3HB4HB copolymer is preferably 1–99%, more preferably 5–50%, most preferably 8–20%. Especially preferred percentages are 8%, 90/%, 10%, 11%, 12%, 13%, 14%, 15%, 16%, 17%, 18%, 19%, and 20%.

The nucleant can be any nucleant known to be effective in nucleating PHAs. A preferred nucleant is boron nitride. The concentration of nucleant can be any concentration known to be effective for the nucleation of PHAs using the nucleant. Typically, preferred concentrations of nucleant are 0.1 to 20 wt/o, more preferably 1 to 10 wt %. For boron nitride, a most preferred concentration is 1 phr.

The composition of P3HB4HB and nucleant has favorable and unexpected elongation properties, and can be used in the applications described above for the blends.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

EXAMPLES 1–4: EFFECT OF PLASTICIZER ON TOUGHNESS OF PHBV/PCL BLENDS

Example 1

100 phr PHBV (8% HV, Mw-895K) powder was blended with 1 phr Boron nitride in a Papenmeier high speed mixer followed by addition of 50 phr Tone 787P (Union Carbide, Mw=206K) corresponding to 33% PCL in the total blend. No plasticizer was added in this example. The powder/granule mixture was then fed into a Betol single screw extruder (25 mm; L/D=20), operated at 40 rpm using a temperature profile from 140 to 170° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 490K and a MFI(170° C./5 Kg)=3 g/10 min. Test bars were obtained by feeding the granules into 15 T Boy injection molding equipment using a temperature profile from 130 to 150° C. and a mold temperature around 55° C. Tensile testing on molded bars (5×2 mm section, 42 mm gauge length, 10 mm:min crosshead speed) gave elongation at break of 235% as molded, 176% after one day and 23% after 100 days. The results are presented in Table 1.

Example 2

100 phr PHBV (8% HV, Mw=895K) powder was blended with 1 phr Boron nitride in a Papenmeier high speed mixer followed by addition of 10 phr Acetyl tributyl citrate (ATC) plasticizer under continuous agitation. After 5 minutes, 50 phr of PCL Tone 787P (Union Carbide, Mw=206K) granules were added under agitation, corresponding to 31% PCL in the total blend. The powder/granule mixture was then fed into a Betol single screw extruder (25 mm; L/D=20), operated at 40 rpm using a temperature profile from 140 to 170° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 530K and a MFI(170° C./5 Kg)=4.2 g/10 min. Test bars were obtained by feeding the granules into 15 T Boy injection molding equipment using a temperature profile from 130 to 150° C. and a mold temperature around 55° C. Tensile testing on molded bars (5×5 mm section, 42 mm gauge length, 10 mm:min crosshead speed) gave elongation at break of 340% as molded, 335% after one day and 60% after 100 days. The results are presented in Table 1.

Example 3

100 phr PHBV (8% HV, Mw=895K) powder was blended with 1 phr Boron nitride in a Papenmeier high speed mixer followed by addition of 10 phr Santicizer 409A polymeric plasticizer (1,3 butylene glycol-1,2 propylene glycol-adipic acid copolyester terminated with 2-ethylhexanol; Mw=4200) under continuous agitation. After 5 minutes, 50 phr of PCL Tone 787P (Union Carbide, Mw-206K) granules were added under agitation, corresponding to 31% PCL in the total blend. The powder/granule mixture was then fed into a Betol single screw extruder (25 mm; L/D=20), operated at 40 rpm using a temperature profile from 140 to 170° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 495K and a MFI(170° C./5 Kg)=4.7 g/10 min. Test bars were obtained by feeding the granules into 15 T Boy injection molding equipment using a temperature profile from 130 to 150° C. and a mold temperature around 55° C. Tensile testing on molded bars (5×2 mm section, 42 mm gauge length, 10 nm:min crosshead speed) gave elongation at break of 333% as molded, 290% after one day and 245% after 100 days. Results are presented in Table 1.

Example 4

100 phr PHBV (8% HV, Mw=895K) powder was blended with 1 phr Boron nitride in a Papenmeier high speed mixer followed by addition of 10 phr Santicizer 430 polymeric plasticizer (1,3 butylene glycol-adipic acid copolyester, unterminated; Mw=5500) under continuous agitation. After 5 minutes, 50 phr of PCL Tone 787P (Union Carbide, Mw=206K) granules were added under agitation, corresponding to 31% PCL in the total blend. The powder/granule mixture was then fed into a Betol single screw extruder (25 mm; L/D=20), operated at 40 rpm using a temperature profile from 140 to 170° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 600K and a MFI(170° C./5 Kg)=5.4 g/10 min. Test bars were obtained by feeding the granules into 15 T Boy injection molding equipment using a temperature profile from 130 to 150° C. and a mold temperature around 55° C. Tensile testing on molded bars (5×2 mm section, 42 mm gauge length, 10 mm:min crosshead speed) gave elongation at break of 417% as molded, 379% after one day and 348% after 60 days. Results are presented in Table 1.

TABLE 1

Summarized Results of Examples 1–4

| Example: | 1 | 2 | 3 | 4 |
|---|---|---|---|---|
| Plasticizer: | none | ATC | S409A | S430 |
| % EB After: | | | | |
| 1 day | 235 | 340 | 333 | 379 |
| 7 days | 176 | 335 | 290 | 354 |
| 14 days | 62 | 290 | 240 | 340 |
| 28 days | 56 | 94 | 215 | 378 |
| 60 days | 26 | 50 | 230 | 348 |
| 100 days | 23 | 60 | 245 | 350 |

% EB = % elongation at break
ATC = Acetyl tributyl citrate
S409A = 1,3 butylene glycol-1,2 propylene glycol-adipic acid copolyester terminated with 2 ethylhexanol.
S430: 1,3 butyleneglycol-adipic acid copolyester
D400P Mw = 895K: 100 phr
Plasticizer: 10 phr
PCL Tone 787P: 50 phr Boron nitride nucleant: 1 phr

EXAMPLES 5–9: EFFECT OF PCL LEVEL ON TOUGHNESS OF PHBV/S430/PCL BLENDS

Example 5

100 phr PHBV (8% HV, Mw-895K) powder was blended with 1 phr Boron nitride in a Papenmeier high speed mixer followed by addition of 10 phr Santicizer 430 polyester polymeric plasticizer (1,3 butylene glycol adipic acid copolyester, unterminated; Mw=5500) under continuous agitation. The powder mixture was then fed into a Betol single screw extruder (25 mm; L/D=20), operated at 40 rpm using a temperature profile from 150 to 180° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 650K and a MFI(170°C/5 Kg)=4 g/10 min. Test bars were obtained by feeding the granules into 15 T Boy injection molding equipment using a temperature profile from 140 to 160° C. and a mold temperature around 55° C. Tensile testing on molded bars (5×2 mm section, 42 mm gauge length, 10 mm:min crosshead speed) gave elongation at break of 258% as molded, 27% after one day and 10% after 60 days. Results are provided in Table 2.

Example 6

100 phr PHBV (8% HV, Mw=895K) powder was blended with 1 phr Boron nitride in a Papenmeier high speed mixer followed by addition of 10 phr Santicizer 430 polyester polymeric plasticizer under continuous agitation. After 5 minutes, 30 phr of PCL Tone 787P (Union Carbide) granules were added under agitation. The powder/granule mixture was then fed into a Betol single screw extruder (25 mm; p 20) operated at 40 rpm using a temperature profile from 150 to 180° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 600K and a MFI(170° C./5 Kg)=4.8 g/10 min. The granules were fed into 15 T Boy injection molding equipment using a temperature profile from 140 to 160° C. and a mold temperature around 55° C. Tensile testing on molded bars (5×2 mm section, 42 mm gauge length, 10 mm:min crosshead speed) gave elongation at break of 515% as molded, 454% after one day and 27% after 60 days. Results are presented in Table 2.

Example 7

100 phr PHBV (8% HV, Mw=895K) powder was blended with 1 phr Boron nitride in a Papenmeier high speed mixer followed by addition of 10 phr Santicizer 430 polyester polymeric plasticizer under continuous agitation. After 5 minutes, 40 phr of PCL Tone 787P (Union Carbide) granules were added under agitation. The powder/granule mixture was then fed into a Betol single screw extruder (25 mm; L/D=20), operated at 40 rpm using a temperature profile from 140 to 170° C. and a screw speed of 40 rpm, and fitted with a 4 mm single strand die. The extrudate was cooled in a water bath maintained at 60°C.+/−5° C. using a thermoregulator and then cut into granules in a pelletizer. The granules obtained had a Mw around 620K and a MFI(170° C./5 Kg)=4.3 g/10 min. The granules were fed into 15 T Boy injection molding equipment using a temperature profile from 130 to 150° C. and a mold temperature around 55° C. Tensile testing on molded bars (5×2 mm section, 42 mm gauge length, 10 mm:min crosshead speed) gave elongation at break of 41 1% as molded, 384% after one day and 335% after 60 days. Results are presented in Table 2.

Example 8

100 phr PHBV (8% HV, Mw=895K) powder was blended with 1 phr Boron nitride in a Papenmeier high speed mixer followed by addition of 10 phr Santicizer 430 polyester polymeric plasticizer under continuous agitation. After 5 minutes, 50 phr of PCL Tone 787P (Union Carbide) granules were added under agitation. The powder/granule mixture was then fed into a Betol single screw extruder (25 mm; L/D=20) operated at 40 rpm using a temperature profile from 140 to 170° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 600K and a MFI(170° C./5 Kg)=5.4 g/10 min. The granules were fed into 15 T Boy injection molding equipment using a temperature profile from 130 to 150° C. and a mold temperature around 55° C. Tensile testing on molded bars (5×2 mm section, 42 mm gauge length, 10 mm:min crosshead speed) gave elongation at break of 417% as molded, 3790/o after one day and 348% after 60 days. Results are presented 9 in Table 2.

Example 9

100 phr PHBV (8% HV, Mw=895K) powder was blended with 1 phr Boron nitride in a Papenmeier high speed mixer followed by addition of 10 phr Santicizer 430 polyester polymeric plasticizer under continuous agitation. After 5 minutes, 70 phr of PCL Tone 787P (Union Carbide) granules were added under agitation. The powder/granule mixture was then fed into a Betol single screw extruder (25 mm; L/D=20), operated at 40 rpm using a temperature profile from 140 to 160° C. and a screw speed of 40 rpm, and fitted with a 4 mm single strand die. The extrudate was cooled in a water bath maintained at 60°C+/−5° C. using a thermoregulator and then cut into granules in a pelletizer. The granules obtained had a Mw around 610K and a MFI(170° C./5 Kg)=4.8 g/10 min. The granules were fed into 15 T Boy injection molding equipment using a temperature profile from 130 to 140° C. and a mold temperature around 40° C. Tensile testing on molded bars (5×2 mm section, 42 mm gauge length, 10 mm:min crosshead speed) gave elongation at break of 284% as molded, 279% after one day and 270% after 60 days. Results are presented in Table 2.

TABLE 2

Summarized Results for Examples 5–9

| Example: | 5 | 6 | 7 | 8 | 9 |
|---|---|---|---|---|---|
| PCL (phr) | 0 | 30 | 40 | 50 | 70 |
| PCL % in blend | 0 | 21 | 26 | 31 | 39 |

TABLE 2-continued

Summarized Results for Examples 5–9

| Example: | 5 | 6 | 7 | 8 | 9 |
|---|---|---|---|---|---|
| % EB After: | | | | | |
| 3 hrs | 258 | 515 | 411 | 417 | 284 |
| 1 day | 27 | 454 | 384 | 379 | 279 |
| 7 days | 12 | 242 | 363 | 354 | 258 |
| 14 days | 12 | 221 | 341 | 347 | 272 |
| 28 days | 10 | 133 | 365 | 378 | 243 |
| 60 days | 10 | 27 | 335 | 348 | 270 |
| Notched Izod Impact(KJ/m2) | 3.4 | 3.6 | 5.7 | 5.4 | 26.4 |

% EB = % elongation at break
D400P Mw = 895K: 100 phr
S430 polyester plasticizer: 10 phr
PCL Tone 787P: variable
Boron nitride nucleant: 1 phr

EXAMPLES 10–13: EFFECT OF PCL LEVEL ON ELONGATION OF PHBV/S430/PCL BLOWN FILMS

Example 10

The granules obtained as described in example 5 based on 100 phr PHBV, 1 phr BN and 10 phr S430 were fed into a 22 mm single screw Formac film blowing extruder fitted with a 50 mm circular die (die gap=1 mm) using a temperature profile from 155 to 165° C. and a screw speed around 12 rpm. The extruded tubular film which cooled and blown with air to a 70 mm diameter bubble produced after collapsing between nip rolls a film with an average thickness of 70 microns characterized by a tensile strength after one day around 26 MPa and an elongation at break of 13%. After 21 days, the tensile strength was 27 MPa and the elongation was 6%. Results are presented in Table 3.

Example 11

The granules obtained as described in example 6 based on 100 phr PHBV, 1 phr BN, 10 phr S430, 0.15 phr antiblocking agent and 30 phr PCL were fed into a 22 mm single screw Formac film blowing extruder fitted with a 50 mm circular die (die gap=1 mm) using a temperature profile from 155 to 165° C. and a screw speed around 13 rpm. The extruded tubular film which cooled and blown with air to a 65 mm diameter bubble produced after collapsing between nip rolls a film with an average thickness of 85 microns characterized by a tensile strength after one day around 32 MPa and an elongation at break of 800%. After 21 days, the tensile strength was 32 MPa and the elongation was 750%. Results are presented in Table 3.

Example 12

The granules obtained as described in example 7 based on 100 phr PHBV, 1 phr BN, 10 phr S430, 0.15 phr antiblocking agent and 40 phr PCL were fed into a 22 mm single screw Formac film blowing extruder fitted with a 50 mm circular die (die gap=Il mm) using a temperature profile from 155 to 165° C. and a screw speed around 13 rpm. The extruded tubular film which cooled and blown with air to a 65 mm diameter bubble produced after collapsing between nip rolls a film with an average thickness of 90 microns characterized by tensile strength after one day around 36 MPa and an elongation at break of 970%. After 21 days, the tensile strength was 36 MPa and the elongation was 900%. Results are presented in Table 3.

Example 13

The granules obtained as described in example 8 based on 100 phr PHBV, 1 phr BN, 10 phr S430, 0.15 phr anti-blocking agent and 50 phr PCL were fed into a 22 mm single screw Formac film blowing extruder fitted with a 50 mm circular die (die gap=1 mm) using a temperature profile from 155 to 165° C. and a screw speed around 13 rpm. The extruded tubular film which cooled and blown with air to a 65 mm diameter bubble produced after collapsing between nip rolls a film with an average thickness of 85 microns characterized by tensile strength after one day around 35 MPa and an elongation at break of 925%. After 21 days, the tensile strength was 36 MPa and the elongation was 790%. Results are presented in Table 3.

TABLE 3

Summarized Results for Examples 10–13

| Example: | 10 | 11 | 12 | 13 |
|---|---|---|---|---|
| PCL (phr) | 0 | 30 | 40 | 50 |
| PCL % in blend | 0 | 21 | 26 | 31 |
| Film thickness ($\mu$m) | 70 | 85 | 90 | 85 |
| TSB (MPa) After | | | | |
| 1 day | 26 | 32 | 36 | 35 |
| 7 days | 27 | 33 | 35 | 32 |
| 21 days | 27 | 32 | 36 | 36 |
| % EB After: | | | | |
| 1 day | 13 | 800 | 970 | 925 |
| 7 days | 5 | 790 | 950 | 870 |
| 21 days | 6 | 750 | 900 | 790 |

TSB = tensile strength at break
% EB = % elongation at break
D400P Mw = 895K: 100 phr
Stearamide anti-blocking: 0.15 phr
Boron nitride nucleant: 1 phr
PCL Tone 787P: variable
S430 polyester plasticizer: 10 phr

EXAMPLES 14–17: EFFECT OF PCL LEVEL ON ELONGATION OF PHBV/S430/PCL CAST FILMS

All cast films were obtained on a Dr Collin cast film line consisting in a 45 mm diameter, L/D single screw extruder fitted with a 500 mm wide flat die with 1 mm die gap. The temperature profile of the barrel was set from 145° C. to 155° C. The adaptor temperature was set at 156° C. while the die temperatures were set at 170° C. The extruded film was deposited on a temperature regulated metal chill roll (T1=75° C.)) followed by nip rolls composed of one rubber roll exercising a pressure on a second heated metal chill roll (T2=45° C.). The three rolls had a diameter of 150 mm. The line was followed by a series of small "free" rolls up to a pulling/winder roll arrangement. Different film thickness were obtained by varying the screw speed (output) of the extruder and the chill roll speed.

Example 14

Granules obtained as described in example 6 based on 100 phr PHBV, 1 phr BN, 10 phr S430, 0.15 phr anti-blocking agent and 30 phr PCL were fed into the Dr Collin cast film line described here above. Using a screw speed of 20 rpm and a pulling speed of 2.5 m/min, a 70 $\mu$m thick, 300 mm wide cast film was obtained. Tensile testing was carried out on stamped dog-bone bars (4 mm wide, 20 mm gauge length and 10 mm/min crosshead speed). The film was characterized by a tensile strength at break (in machine direction) after one week around 26 MPa and an elongation at break of 480%. After 100 days, the elongation was 32%. Results are presented in Table 4.

Example 15

Granules obtained as described in example 6 based on 100 phr PHBV, 1 phr BN, 10 phr S430, 0.15 phr anti-blocking agent and 30 phr PCL were fed into the Dr Collin cast film line described here above. Using a screw speed of 25 rpm and a pulling speed of 2.0 m/min, a 120 $\mu$m thick, 360 mm wide cast film was obtained. Tensile testing was carried out on stamped dog-bone bars (4 mm wide, 20 mm gauge length and 10 mm/min crosshead speed). The film was characterized by a tensile strength at break (in machine direction) after one week around 25 MPa and an elongation at break of 570%. After 100 days, the elongation was 40%. Results are presented in Table 4.

Example 16

Granules obtained as described in example 7 based on 100 phr PHBV, 1 phr BN, 10 phr S430, 0.15 phr anti-blocking agent and 40 phr PCL were fed into the Dr Collin cast film line described here above. Using a screw speed of 20 rpm and a pulling speed of 2.1 m/min, a 110 $\mu$m thick, 300 mm wide cast film was obtained. Tensile testing was carried out on stamped dog-bone bars (4 mm wide, 20 mm gauge length and 10 mm/min crosshead speed). The film was characterized by a tensile strength at break (in machine direction) after one week around 35 MPa and an elongation at break of 780%. After 100 days, the elongation was 700%. Results are presented in Table 4.

Example 17

Granules obtained as described in example 7 based on 100 phr PHBV, 1 phr BN, 10 phr S430, 0.15 phr anti-blocking agent and 40 phr PCL were fed into the Dr Collin cast film line described here above. Using a screw speed of 30 rpm and a pulling speed of 2.0 m/min, a 145 $\mu$m thick, 360 mm wide cast film was obtained. Tensile testing was carried out on stamped dog-bone bars (4 mm wide, 20 mm gauge length and 10 mm/min crosshead speed). The film was characterized by a tensile strength at break (in machine direction) after one week around 31 MPa and an elongation at break of 800%. After 100 days, the elongation was 620%. Results are presented in Table 4.

TABLE 4

Summarized Results for Examples 14–17

| Example | 14 | 15 | 16 | 17 |
|---|---|---|---|---|
| PCL (phr) | 30 | | 40 | |
| PCL (%) | | 21 | | 26 |
| Film thickness ($\mu$) | 70 | 120 | 110 | 145 |
| EB % | | | | |
| After 7 days | 480 | 570 | 780 | 800 |
| After 30 days | 160 | 72 | 760 | 770 |
| After 60 days | 65 | 63 | 740 | 730 |
| After 100 days | 32 | 40 | 700 | 620 |

EB = Elongation at break
Composition:
400P Mw = 895K: 100 phr
Boron nitride nucleant: 1 phr
S430 polyester plasticizer: 10 phr
Stearamide anti-blocking: 0.15 phr
PCL Tone P-787: variable

EXAMPLES 18–19: EFFECT OF PLASTICIZER ON TOUGHNESS OF PHBV/PBSUA BLENDS

Example 18

100 phr PHBV (8% HV, Mw=895K) powder was blended with 1 phr Boron nitride in a Papenmeier high speed mixer, followed by addition of 10 phr S430 PBGA plasticizer and 40 phr Bionolle 3001 PBSUA granules (Union Carbide, Mw=204K), corresponding to 26% PBSUA in the total blend.

The powder/granule mixture was then fed into a Betol single screw extruder (25 mm; L/D=20) operated at 40 rpm using a temperature profile from 140 to 170° C. and a screw speed of 40 rpm, and fitted with a 4 mm single strand die. The extrudate was cooled in a water bath maintained at 60°C.+/−5° C. using a thermoregulator and then cut into granules in a pelletizer. The output was 3.4 Kg/hr. The granules obtained had a Mw around 650° K and a MFI (170° C./5 Kg)=3.5 g/10 min.

Test bars were obtained by feeding the granules into a 15 T Boy injection molding equipment using a temperature profile from 130 to 150° C. and a mold temperature around 55° C. Tensile testing on molded bars (5×2 mm section, 42 mm gauge length, 10 mm:min crosshead speed) gave elongation at break of 320% as molded, 310% after 30 days, and 65% after 90 days. Results are presented in Table 5.

Example 19

100 phr PHBV (8% HV, Mw=895K) powder was blended with 1 phr Boron nitride in a Papenmeier high speed mixer, followed by addition of 10 phr S430 PBGA plasticizer and 50 phr Bionolle 3001 PBSUA granules (Union Carbide, Mw=204K), corresponding to 31% PBSUA in the total blend.

The powder/granule mixture was then fed into a Betol single screw extruder (25 mm; L/D=20) operated at 40 rpm using a temperature profile from 140 to 170° C. and a screw speed of 40 rpm, and fitted with a 4 mm single strand die. The extrudate was cooled in a water bath maintained at 60°C+/−5° C. using a thermoregulator and then cut into granules in a pelletizer. The output was 3.3 Kg/hr. The granules obtained had a Mw around 620°K and a MFI (170° C./5 Kg)=3.6 g/10 min.

Test bars were obtained by feeding the granules into a 15 T Boy injection molding equipment using a temperature profile from 130 to 150° C. and a mold temperature around 55° C. Tensile testing on molded bars (5×2 mm section, 42 mm gauge length, 10 mm:min crosshead speed) gave elongation at break of 360% as molded, 390% after 30 days, and 340% after 90 days. Results are presented in Table 5.

TABLE 5

Summarized Results for Examples 18–19

| Example | 18 | 19 |
|---|---|---|
| PBSUA (phr) | 40 | 50 |
| PBSUA % in blend | 26 | 31 |
| % Elongation at break After | | |
| 3 hrs | 320 | 360 |
| 3 days | 330 | 450 |
| 7 days | 310 | 420 |
| 15 days | 315 | 440 |
| 30 days | 310 | 400 |
| 60 days | 100 | 335 |
| 90 days | 65 | 345 |

Composition:
D400P Mw = 895K: 100 phr
Boron nitride nucleant: 1 phr
S430 polyester plasticizer: 10 phr
Bionolle 3001 PBSUA: variable EXAMPLES 20–23: EFFECT OF PBSUA LEVEL ON ELONGATION OF PHBV/S430/PBSUA BLOWN FILMS:

All blown films were obtained on a 20 mm diameter Brabender/Haake single screw extruder fitted with a circular die and a 1 meter high blowing tower equipped with two 80 mm diameter nip rolls. The film width and thickness was adjusted by varying the screw speed of the extruder, the pulling rate of the tubular film and the diameter of the bubble.

Example 20

Granules obtained as described in example 18 based on 100 phr PHBV, 1 phr BN, phr S430, and 40 phr Bionolle 3001 PBSUA were extruded through a 20 mm single screw extruder fitted with a 25 mm circular die using a temperature profile from 160 to 170° C. At a screw speed of 15 rpm and a pulling rate of 1.5 m/min., the extruded tubular preform, which was cooled and blown with air to a 25 mm diameter bubble, produced after collapsing between two nip rolls a film with a width of 80 mm and a thickness of 65 $\mu$m. Tensile testing stamped dog-bone bars (4 mm wide, 20 mm gauge length and 10 mm/min crosshead speed) gave an elongation at break of 670% after 5 days and 720% after 90 days. Results are presented in Table 6.

Example 21

Granules obtained as described in example 18 based on 100 phr PHBV, 1 phr BN, 10 phr S430, and 40 phr Bionolle 3001 PBSUA were extruded through a 20 mm single screw extruder fitted with a 25 mm circular die using a temperature profile from 160 to 170° C. At a screw speed of 15 rpm and a pulling rate of 1.5 m/min, the extruded tubular preform, which was cooled and blown with air to a 20 mm diameter bubble, produced after collapsing between two nip rolls a film with a width of 65 mm and a thickness of 130 $\mu$m. Tensile testing stamped dog-bone bars (4 mm wide, 20 mm gauge length and 10 mm/min crosshead speed) gave an elongation at break of 590% after 5 days and 620% after 90 days. Results are presented in Table 6.

Example 22

Granules obtained as described in example 19 based on 100 phr PHBV, 1 phr BN, 10 phr S430, and 50 phr Bionolle 3001 PBSUA were extruded through a 20 mm single screw extruder fitted with a 25 mm circular die using a temperature profile from 165 to 170° C. At a screw speed of 20 rpm and a pulling rate of 2 m/min, the extruded tubular preform, which was cooled and blown with air to a 25 mm diameter bubble, produced after collapsing between two nip rolls a film with a width of 85 mm and a thickness of 80 $\mu$m. Tensile testing stamped dog-bone bars (4 mm wide, 20 mm gauge length and 10 mm/min crosshead speed) gave an elongation at break of 610% after 5 days and 805% after 90 days. Results are presented in Table 6.

Example 23

Granules obtained as described in example 19 based on 100 phr PHBV, 1 phr BN, 10 phr S430, and 50 phr Bionolle 3001 PBSUA were extruded through a 20 mm single screw extruder fitted with a 25 mm circular die using a temperature profile from 165 to 170° C. At a screw speed of 15 rpm and a pulling rate of 1 m/min, the extruded tubular preform, which was cooled and blown with air to a 18 mm diameter bubble, produced after collapsing between two nip rolls a film with a width of 55 mm and a thickness of 180 $\mu$m. Tensile testing stamped dog-bone bars (4 mm wide, 20 mm gauge length and 10 mm/min crosshead speed) gave an elongation at break of 1080% after 5 days and 700% after 90 days. Results are presented in Table 6.

TABLE 6

Summarized Results for Examples 20–23

| Example | 20 | 21 | 22 | 23 |
|---|---|---|---|---|
| PBSUA (phr) |  | 40 |  | 50 |
| PBSUA (%) |  | 26 |  | 31 |
| Film thickness ($\mu$m) | 65 | 130 | 80 | 180 |
| EB % |  |  |  |  |
| After 5 days | 670 | 590 | 610 | 1080 |
| After 30 days | 700 | 580 | 800 | 840 |
| After 60 days | 725 | 610 | 780 | 750 |
| After 90 days | 720 | 620 | 805 | 700 |

EB = Elongation at break
Composition:
D400P Mw = 895K: 100 phr
Boron nitride nucleant: 1 phr
S430 polyester plasticizer: 10 phr
Bionolle 3001 PBSUA: variable

EXAMPLE 24: TOUGHNESS OF P3HB-4HB BLEND

Example 24

100 phr P3HB4HB (13% 4HB, Mw=1180K) powder was blended with 1 phr Boron nitride in a Papenmeier high speed mixer. The powder mixture was then fed into a Haake single screw extruder (20 mm; L/D=25; Compression ratio 3:1) using a temperature profile from 155 to 185° C. and a screw speed of 40 rpm, and fitted with a 3 mm single strand die. The extrudate was cooled in a water bath maintained at 60°C+/−5° C. using a thermoregulator and then cut into granules in a pelletizer. The granules obtained had a Mw around 800K.

Tensile test bars were obtained by hot pressing the granules between two Teflon coated metal plates heated at 180° C. and stamping dog-bone bars 4 mm wide with a 20 mm gauge length. Tensile testing gave elongation at break of 1080% about 3 hr after molding and 920% after 100 days. Results are presented in Table 7.

TABLE 7

Summarized Results for Example 24

| Example | 24 |
|---|---|
| Elongation at break on hot pressed films |  |
| After 3 hrs | 1080% |
| After 1 day | 1100% |
| After 30 days | 850% |
| After 75 days | 920% |

Composition:
P3HB-4HB(13% 4HB; Mw = 1180K): 100 phr
Boron nitride nucleant: 1 phr

EXAMPLES 25–26: EFFECT OF FILM THICKNESS ON ELONGATION OF P3HB4HB BLOWN FILMS:

All blown films were obtained on a 20 mm diameter Brabender/Haake single screw extruder fitted with a circular die and a 1 meter high blowing tower equipped with two 80 mm diameter nip rolls. The film width and thickness was adjusted by varying the screw speed of the extruder, the pulling rate of the tubular film and the diameter of the bubble.

Example 25

Granules obtained as described in example 24 based on 100 phr P3HB4HB and 1 phr BN were extruded through a 20 mm single screw extruder fitted with a 25 mm circular die using a temperature profile from 170 to 180° C. At a screw speed of 15 rpm and a pulling rate of 1 m/min, the extruded tubular preform, which was cooled and blown with air to a 22 mm diameter bubble, produced after collapsing between two nip rolls a film with a width of 70 mm and a thickness of 85 $\mu$m. Tensile testing on dog-bone samples stamped from the film in the machine direction (4 mm wide, 20 mm gauge length) gave an elongation at break of 710% after 5 days and 560% after 90 days. Results are presented in Table 9.

Example 26

Granules obtained as described in example 24 based on 100 phr P3HB4HB and 1 phr BN were extruded through a 20 mm single screw extruder fitted with a 25 mm circular die using a temperature profile from 170 to 180° C. At a screw speed of 15 rpm and a pulling rate of 1 m/min, the extruded tubular preform, which was cooled and blown with air to a 18 mm diameter bubble, produced after collapsing between two nip rolls a film with a width of 55 mm and a thickness of 130 $\mu$m. Tensile testing on dog-bone samples stamped from the film in the machine direction (4 mm wide, 20 mm gauge length) gave an elongation at break of 710% after 5 days and 560% after 90 days. Results are presented in Table 9.

TABLE 9

Summarized Results for Examples 25–26

| Example | 25 | 26 |
|---|---|---|
| Film thickness ($\mu$m) | 85 | 130 |
| EB % |  |  |
| After 5 days | 710 | 780 |
| After 30 days | 640 | 620 |
| After 60 days | 620 | 630 |
| After 90 days | 560 | 620 |

EB = Elongation at break
Composition:
P3HB-4HB: 100 phr
Boron nitride nucleant: 1 phr All of the compositions and methods disclosed and claimed herein can be made and executed without undue experimentation in light of the present disclosure. While the invention has been described in terms of preferred embodiments, it will be apparent to those of skill in the art that variations may be applied to the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A polymer composition comprising poly-3-hydroxybutyrate-co-4hydroxybutyrate (P3HB4HB) blend and a nucleant with no plasticizer, wherein the percentage of 4hydroxybutyrate (4HB) in the P3HB41B is between 16% and 99%.

2. The composition of claim 1 wherein the nucleant is boron nitride.

3. The composition of claim 1 wherein the nucleant is present at levels between 0.1 and 20 wt % of the blend.

4. The composition of claim 1 wherein the nucleant is present at levels between 1 and 10 wt % of the blend.

5. A method of producing a shaped polymeric object comprising melting a composition comprising a poly-3hydroxybutyrate-co-4hydroxybutyrate (P3HB4HB) blend wherein the percentage of 4-hydroxybutyrate (4HB) in the P3HB4HB is between 16% and 99% and a nucleant with no plasticizer, and producing a shaped object therefrom by extrusion, molding, coating, spinning, blowing, thermoforming or calendaring processes or combinations of the processes.

6. The method of claim 5, wherein the nucleant is boron nitride.

7. A shaped object made according to claim 5.

8. A shaped object made according to claim 6.

9. A polymer composition comprising a poly-3-hydroxybutyrate-co-hydroxybutyrate (P3HB 4HB) blend and a nucleant with no plasticizer, wherein the nucleant is present at a level of 0.1 wt % of the composition.

10. The composition of claim 9 wherein the nucleant is boron nitride.

11. A method of producing a shaped polymeric object comprising melting a composition comprising a poly-3-hydroxybutyrate-co-4-hydroxybutyrate (P3HB4HB) blend and a nucleant with no plasticizer, and producing a shad object therefrom by extrusion, molding, coating, spinning, blowing, thermoforming or calendaring processes or combinations of the processes, wherein the nucleant is present at a level of 0.1 wt % of the composition.

12. The method of claim 11 wherein the nucleant is boron nitride.

13. A shaped object made comprising the composition of claim 10.

14. A shaped object made according to claim 11.

15. A polymer composition comprising poly-3-hydroxybutyrate-co-4-hydroxybutyrate (P3HB4HB) blend and a nucleant with no plasticizer wherein the composition is capable of forming a film having elongation.

16. The composition of claim 15 wherein the elongation at break is in the range between 560% and 1100% as measured by tensile testing on molded bars (4 mm wide and 20 mm gauge length.

17. The composition of claim 15, wherein the nucleant is present at a level between 0.1 and 20 wt % of the composition.

18. The composition of claim 15 wherein the nucleant is present at a level between 1 and 10% of the composition.

19. A method of producing a shaped polymeric object comprising melting a composition comprising a poly-3-hydroxybutyrate-co-4-hydroxybutyrate (P3HB4HB) blend and a nucleant with no plasticizer, and producing a shaped object therefrom by extrusion, molding, coating, spinning, blowing, thermoforming or calendaring processes or combinations of the processes, wherein the composition is capable of forming a film having elongation.

20. The method of claim 19 wherein the elongation at break is in the range between 560% and 1100 as measured by tensile testing on molded bars (4 mm wide and 20 mm gauge length).

21. The method of claim 19, wherein the nucleant is present at a level between 0.1 and 20 wt % of the composition.

22. The method of claim 19 wherein the nucleant is present at a level of 1 to 10% of the composition.

23. The method of claim 20 wherein the nucleant is present at a level between 0.1 and 20 wt % of the composition.

24. The method of claim 20, wherein the nucleant is present at a level of 1 to 10% of the composition.

25. The method of claim 19 wherein the nucleant is boron nitride.

26. A shaped article made according to the method of claim 19.

27. A shaped article made according to the method of claim 20.

* * * * *

UNITED STATES PATENT AND TRADEMARK OFFICE
CERTIFICATE OF CORRECTION

| | | |
|---|---|---|
| PATENT NO. | : 6,841,603 B1 | Page 1 of 1 |
| APPLICATION NO. | : 09/714469 | |
| DATED | : January 11, 2005 | |
| INVENTOR(S) | : Jawed Asrar and Jean R. Pierre | |

It is certified that error appears in the above-identified patent and that said Letters Patent is hereby corrected as shown below:

Claim 11, column 21, line 25, replace "shad" with --shaped--.
Claim 16, column 22, line 4, replace "length" with --length)--.

Signed and Sealed this

Seventh Day of August, 2007

JON W. DUDAS
*Director of the United States Patent and Trademark Office*